R. E. BRADLEY.
METHOD AND MEANS FOR TUBE CUTTING.
APPLICATION FILED JULY 8, 1920.
1,428,355.
Patented Sept. 5, 1922.
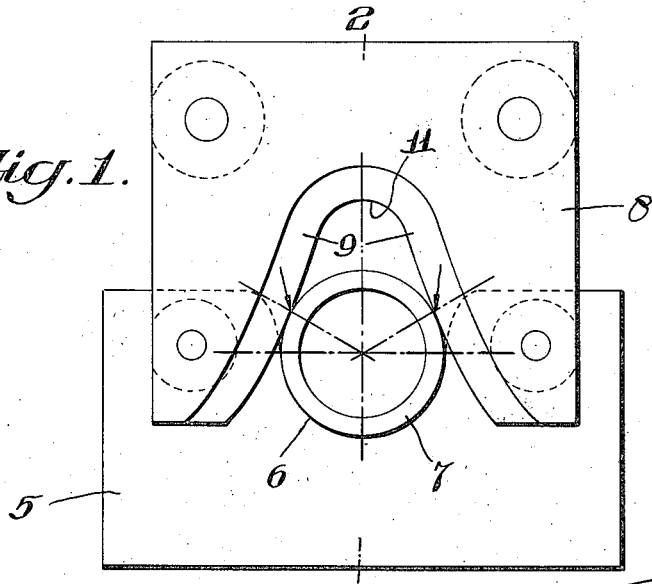
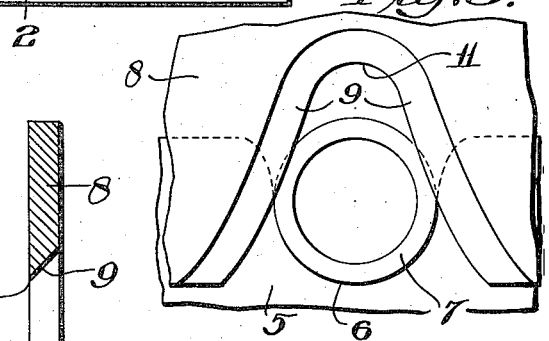
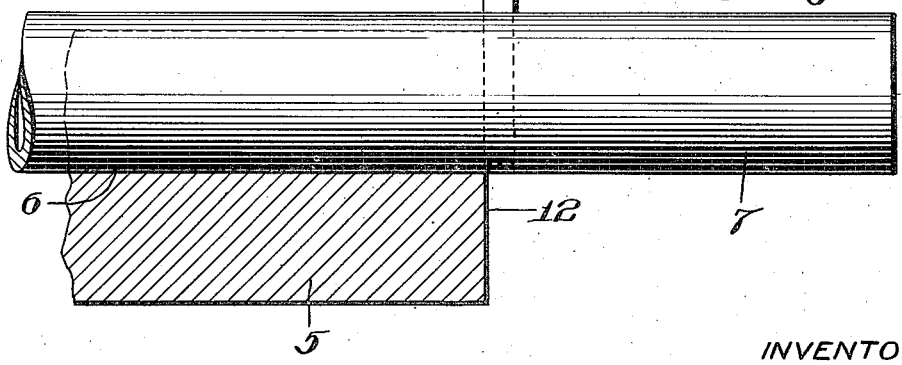
INVENTOR
Ross Edward Bradley,
BY
ATTORNEY Patented Sept. 5, 1922.

1,428,355

UNITED STATES PATENT OFFICE.

ROSS EDWARD BRADLEY, OF ROLAND PARK, MARYLAND.

METHOD AND MEANS FOR TUBE CUTTING.

Application filed July 8, 1920. Serial No. 394,641.

*To all whom it may concern:*

Be it known that I, ROSS EDWARD BRADLEY, a citizen of the United States, residing at Roland Park, in the county of Baltimore, State of Maryland, have invented a new and useful Method and Means for Tube Cutting, of which the following is a specification.

The invention relates to improvements in tube cutting. The object is to provide improved method and means for cutting metal tubes.

The invention is especially adapted to cutting tubes or pipes made of copper, and the alloys thereof, but is also applicable to the cutting of tubes of other metals.

The usual method of cutting tubes of comparatively soft metal is by a saw, or rotating disc, since the ordinary shears would crush the end of the pipe.

The objection to the saw is that it is a slow and expensive method of cutting. The saw teeth soon become dull and there is waste in the saw dust resulting from such operation.

The present invention comprises method and means whereby the shear-action is made possible by applying the cutting pressures at such points in the periphery of the tube and exerting said pressures in such directions as to enable the cutting operation to take place without unduly compressing or distorting the walls of the tube.

Referring to the drawing, which illustrates merely by way of example suitable means for effecting my invention:—

Fig. 1 is a front elevation of the cutter elements and tube to be operated upon.

Fig. 2 is a vertical section on line 2—2 of Fig. 1.

Fig. 3 is a fragmentary elevation showing the cutting member 8 moved slightly into the tube.

Similar numerals refer to similar parts throughout the several views.

The supporting block 5 is provided with the semi-circular channel 6 for supporting the tube 7. This channel 6 should have approximately the same semi-circular cross-section as that of the tube to be operated upon.

The cutting blade 8 is provided with the recessed or loop shaped margin 9 as shown in Fig. 1. This margin 9 of the loop formation is bevelled to form the cutting edge 11 adapted to lie in substantially the same plane as the adjacent vertical face 12 of block 5, as shown in Fig. 2, so as to form a shear therewith.

The blade 8 is given a reciprocating motion, relatively to the block 5, by any suitable reciprocating mechanism, not shown.

The shape of the margin 9 having the cutting edge 11, is such, with respect to the diameter of the tube 7, that said cutting edge 11 engages the periphery of the tube 7 at two points simultaneously, as indicated by the arrows in Fig. 1. As the blade 8 moves from the initial position shown in Fig. 1, toward the position shown in Fig. 2, the parts of the cutting edges 11, adjacent the points indicated by the arrows in Fig. 1, move in lines nearly corresponding to the tangents of the circle of the tube at said points. This results in a sliding movement and pressure of said cutting edges adjacent said points in directions toward the flanking margins of channel 6 in block 5. These margins form supports to the walls of the tube close to the points of pressure thereon by the contacting edges of the cutting blade, and the direction of the pressure so exerted is largely toward said points of support. It will also be noted that when the blade reaches the position in the tube as indicated in Fig. 2, the converging edges of the cutting blade 8 have approached the upper middle portion of the tube, to such a degree that the tendency to distort the wall of the pipe at this point is reduced to a minimum.

The lower half of the tube, being entirely supported in block 5, the further movement of the cutting edges, through this portion of the tube, results in cooperation with block 5, in a shearing action, and accomplishes the balance of the cut without any distortion whatever.

The reciprocating movement of the member 8, relatively to member 5, may be very rapid. Therefore the speed of the operation of cutting the tubes is practically only limited by the rapidity with which the operators are able to place the tubes in position for cutting.

It will therefore be obvious that many more tubes may be cut per minute than by the old method above mentioned. There is no waste by cause of saw dust, and the life of the cutting elements is very much longer than that of the saw or revolving disc.

What I claim is:—

1. The method of cutting metal tubes which consists in supporting half of the tube circumference adjacent the plane of cut, and applying initial cutting pressure at separated points on the tube circumference near the plane of its horizontal diameter so as to secure a distributed cutting action resulting from component vertical and horizontal cutting actions, sufficiently balanced as not unduly to distort the circular cross-section of the tube.

2. The method of cutting metal tubes which consists in supporting half of the tube circumference adjacent the plane of cut, and applying initial cutting pressure at separated points on the tube circumference near the plane of its horizontal diameter so as to secure a distributed cutting action resulting from component vertical and horizontal cutting actions, sufficiently balanced as not unduly to distort the circular cross-section of the tube, and then completing the cutting by a shearing action upon the supported half of the tube.

3. In a tube cutter, the combination of means for supporting half of the tube circumference adjacent the plane of cut, a cutting member having converging cutting edges flanking the tube and adapted to exert initial cutting pressure at separated points on the tube circumference near the plane of its horizontal diameter so as to secure a distributed cutting action resulting from component vertical and horizontal cutting actions, sufficiently balanced as not unduly to distort the circular cross-section of the tube, and means for causing relative movement between the cutting member and the supporting means.

4. In a tube cutter, the combination of means for supporting half of the tube circumference adjacent the plane of cut, a cutting member having converging cutting edges flanking the tube and adapted to exert initial cutting pressure at separated points on the tube circumference near the plane of its horizontal diameter so as to secure a distributed cutting action resulting from component vertical and horizontal cutting actions, sufficiently balanced as not unduly to distort the circular cross-section of the tube, said cutting member cooperating with the supporting means to form a shear during the latter part of the operation, and means for causing relative movement between the cutting member and the supporting means.

5. In a tube cutter, the combination of means for supporting half of the tube circumference adjacent the plane of cut, a cutting member, having a loop shaped cutting edge with converging margins, adapted to exert initial cutting pressure at separated points on the tube circumference near the plane of its horizontal diameter so as to secure a distributed cutting action resulting from component vertical and horizontal cutting actions, sufficiently balanced as not unduly to distort the circular cross-section of the tube, and means for causing relative movement between the cutting member and the supporting means.

ROSS EDWARD BRADLEY.